(12) United States Patent
Hall et al.

(10) Patent No.: US 9,578,311 B2
(45) Date of Patent: Feb. 21, 2017

(54) TIME OF FLIGHT DEPTH CAMERA

(71) Applicant: MICROSOFT TECHNOLOGY LICENSING, LLC, Redmond, WA (US)

(72) Inventors: Michael Anthony Hall, Bellevue, WA (US); Mirko Schmidt, San Francisco, CA (US); Travis Perry, Menlo Park, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 254 days.

(21) Appl. No.: 14/521,145

(22) Filed: Oct. 22, 2014

(65) Prior Publication Data

US 2016/0119611 A1 Apr. 28, 2016

(51) Int. Cl.
*H04N 13/02* (2006.01)
*G01S 17/10* (2006.01)
(Continued)

(52) U.S. Cl.
CPC .......... *H04N 13/0246* (2013.01); *G01S 7/497* (2013.01); *G01S 7/4915* (2013.01); *G01S 17/10* (2013.01); *G01S 17/36* (2013.01); *G01S 17/89* (2013.01); *G06F 3/017* (2013.01); *G06T 7/002* (2013.01); *H04N 5/2256* (2013.01); *G01S 7/003* (2013.01); *G01S 7/4815* (2013.01)

(58) Field of Classification Search
None
See application file for complete search history.

(56) References Cited

U.S. PATENT DOCUMENTS 6,323,942 B1 11/2001 Bamji
6,856,407 B2 2/2005 Knighton et al.
(Continued)

FOREIGN PATENT DOCUMENTS

EP 2264481 A1 12/2010

OTHER PUBLICATIONS

ISA European Patent Office, International Search Report and Written Opinion Issued in PCT Application No. PCT/US2015/056292, Jan. 27, 2016, WIPO, 15 Pages.
(Continued)

*Primary Examiner* — Hung Dang
(74) *Attorney, Agent, or Firm* — Gregg Wisdom; Judy Yee; Micky Minhas

(57) ABSTRACT

A method for operating a time of flight (TOF) depth camera is provided. The method includes, using an image processing module, interpolating an updated timing delay calibration for each of a plurality of pixel sensors based at least on an updated set of modulation frequency and duty cycle calibration combinations received by the image processing module, the plurality of pixel sensors coupled to a timing clock, and receiving light generated by a light source and reflected in a 3-dimensional environment, the updated set of modulation frequency and duty cycle calibration combinations replacing the corresponding factory-preloaded timing delay calibrations. The method further includes applying the updated timing delay calibrations to pixel data corresponding to each of the plurality of the pixel sensors to generate a depth map of the 3-dimensional environment.

20 Claims, 8 Drawing Sheets

(51) Int. Cl.

| | | |
|---|---|---|
| *G01S 17/36* | (2006.01) | |
| *G01S 17/89* | (2006.01) | |
| *G01S 7/491* | (2006.01) | |
| *G01S 7/497* | (2006.01) | |
| *G06F 3/01* | (2006.01) | |
| *G06T 7/00* | (2006.01) | |
| *H04N 5/225* | (2006.01) | |
| *G01S 7/00* | (2006.01) | |
| *G01S 7/481* | (2006.01) | |

(56) References Cited

U.S. PATENT DOCUMENTS

| | | | | |
|---|---|---|---|---|
| 7,433,029 | B1* | 10/2008 | Hsu | G01B 11/26 356/141.5 |
| 8,587,771 | B2 | 11/2013 | Xu et al. | |
| 8,786,678 | B2* | 7/2014 | Schmidt | G01S 17/89 348/46 |
| 2002/0110376 | A1* | 8/2002 | MacLean | G03B 17/48 396/429 |
| 2008/0007709 | A1 | 1/2008 | Bamji et al. | |
| 2008/0088719 | A1* | 4/2008 | Jacob | H04N 5/2256 348/241 |
| 2011/0304696 | A1* | 12/2011 | Centen | G01S 17/89 348/46 |
| 2012/0033045 | A1 | 2/2012 | Schweizer et al. | |
| 2012/0105585 | A1* | 5/2012 | Masalkar | H04N 13/0022 348/46 |
| 2012/0176476 | A1 | 7/2012 | Schmidt et al. | |
| 2012/0249738 | A1 | 10/2012 | Gilboa | |
| 2012/0327293 | A1* | 12/2012 | Ollila | G02B 7/36 348/362 |
| 2013/0063566 | A1 | 3/2013 | Morgan-Mar et al. | |
| 2014/0160461 | A1 | 6/2014 | Van Der Tempel et al. | |
| 2014/0232825 | A1* | 8/2014 | Gotschlich | H04N 13/0246 348/46 |
| 2014/0307126 | A1* | 10/2014 | Son | H04N 5/23212 348/231.6 |
| 2014/0327765 | A1* | 11/2014 | Hsien | G06T 7/0018 348/143 |
| 2014/0368613 | A1* | 12/2014 | Krupka | H04N 13/0022 348/46 |
| 2015/0109414 | A1* | 4/2015 | Adam | G01C 11/02 348/46 |
| 2015/0302570 | A1* | 10/2015 | Shirakyan | G06T 7/0051 348/46 |

OTHER PUBLICATIONS

"More Comfort, Greater Performance—allPIXA Firmware Update", Published on: Jul. 8, 2014 Available at: http://www.chromasens.de/en/news/more-comfort-greater-performance-%E2%80%93-allpixa-firmware-update.

Lindner, et al., "Time-of-Flight Sensor Calibration for Accurate Range Sensing", In Journal of Computer Vision and Image Understanding, vol. 114, Issue 12, Dec. 2010, 11 pages.

Scaramuzza, et al., "Extrinsic Self Calibration of a Camera and a 3D Laser Range Finder from Natural Scenes", In Proceedings of International Conference on Intelligent Robots and Systems, Oct. 29, 2007, 8 pages.

\* cited by examiner

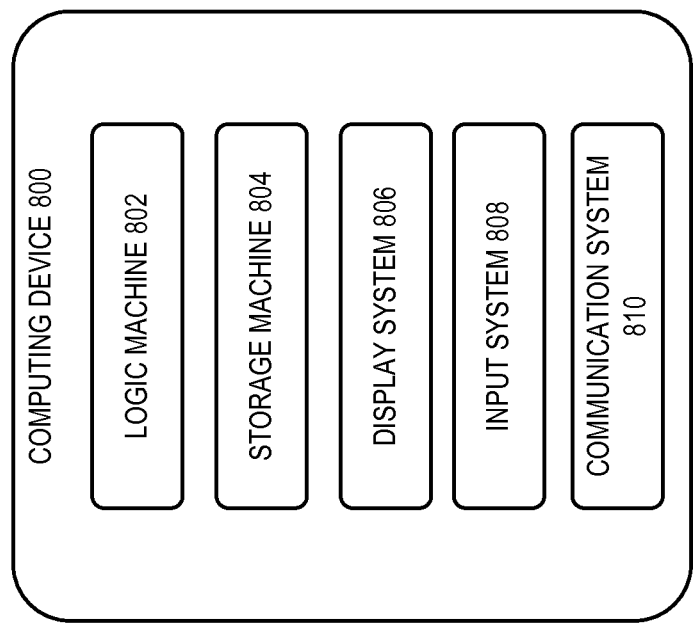

TIME OF FLIGHT DEPTH CAMERA

BACKGROUND

Time of flight (TOF) technology is used in a number of fields to determine the time it takes light to travel through a medium. For instance, TOF methods may be used in cameras to determine depth measurements in 3-dimensional environments.

SUMMARY

A method for operating a time of flight (TOF) depth camera is provided. The method includes, using an image processing module, interpolating an updated timing delay calibration for each of a plurality of pixel sensors based at least on an updated set of modulation frequency and duty cycle calibration combinations received by the image processing module, the plurality of pixel sensors being coupled to a timing clock and receiving light generated by a light source and reflected in a 3-dimensional environment and the updated set of modulation frequency and duty cycle calibration combinations replacing the corresponding factory-preloaded timing delay calibrations, and applying the updated timing delay calibrations to pixel data corresponding to each of the plurality of the pixel sensors to generate a depth map of the 3-dimensional environment. In this way, the timing delay calibration for the pixel sensors can be updated after the camera is shipped to a consumer. As a result, the operational mode of the TOF depth camera can be changed and the performance state of the TOF depth camera can be modified after product launch, enabling the applicability of the TOF depth camera to be expanded. Specifically, the performance of the TOF depth camera may be improved to better suit new operating environments. A variety of parameters in the depth camera may be changed to improve camera operation, such as illumination frequency, duty cycle (e.g., light source and pixel detector duty cycles), peak power and integration time, etc., and the timing delays can be adjusted to match the parameter changes. Adjusting these parameters enables accuracy, precision, depth noise, near and far range, signal to noise ratio, mixed pixel resolution, motion blur, and/or other suitable performance characteristics to be varied in the camera to provide desired operating characteristics. Consequently, the lifespan of the depth camera can be extended and the user experience with the camera can be enhanced when these parameters are able to be dynamically updated after the camera is shipped to the consumer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 shows an exemplary computing device.

DETAILED DESCRIPTION

Depth cameras may be used in entertainment and gaming systems as input devices to identify user movement and execute functions in the device responsive to the detected movement. Depth cameras can also be used in these systems for facial recognition, object scanning, etc. However, it will be appreciated that depth cameras may be used in a multitude of other systems.

Depth cameras may have timing delays due to the configuration of the hardware (e.g., timing clock and light source arrangement) within the camera. Specifically, depth cameras typically include a timing mechanism connected to a pixel sensor and a laser. The pixel sensor may be closer to the timing mechanism than the laser. Consequently, there is a substantial delay between the timing signal received by the pixel sensor and the actual moment of laser illumination triggered by a timing signal. This delay results in depth errors which may be on the order of tens to hundreds of centimeters, in some cases.

To account for these delays, TOF depths cameras can be calibrated at their production factory to determine set timing delays for each pixel sensor in the camera. The timing delay is a quantity which depends on the operational mode of the camera. This operational mode may be determined based on an intended operating environment. For instance, the operational mode in a gaming system may be selected for use in an indoor environment, such as a living room. The factory calibration determines the timing delays for a given operational mode. These factory calibrated delays are static and cannot be modified once the camera is provided to the consumer. Fixing the timing delays in this way limits the flexibility of the camera because it does not allow change to the operational mode. In particular altering optical parameters, such as illumination frequency, duty cycle, peak power, integration time, etc., affects the timing delay, thereby rendering the factory calibrated timing delays invalid. As a result, the applicability of these types of depth cameras is limited as they cannot be dynamically updated in the field. A time of flight (TOF) system and method for operation of the time of flight system, described below, have been developed to improve timing delay calibration.

Figure 1:
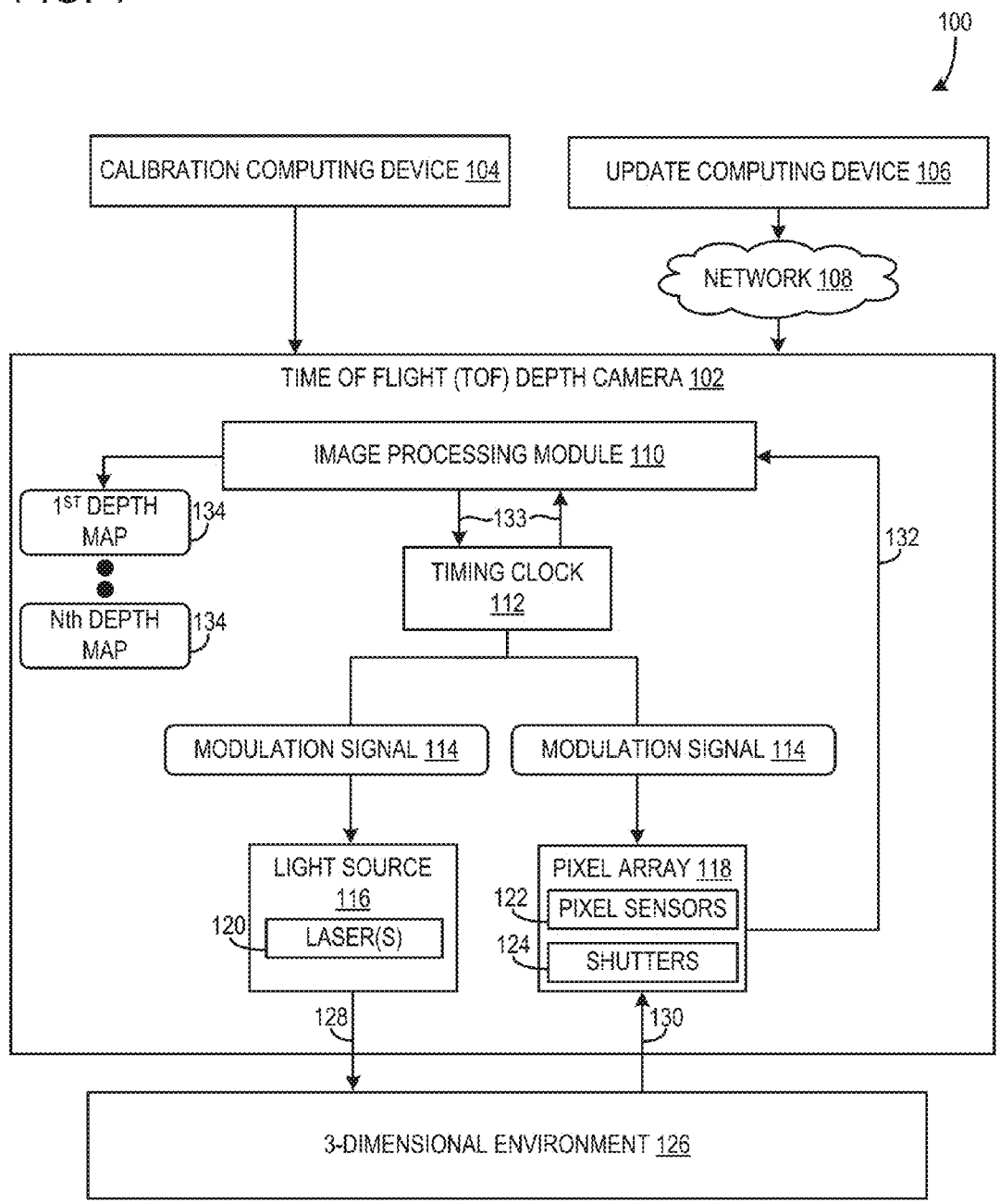
FIG. 1 shows a schematic depiction of a time of flight (TOF) system.

FIG. 1 shows a schematic depiction of a TOF system 100. The TOF system 100 includes a TOF depth camera 102, a calibration computing device 104, and an update computing device 106. The calibration computing device 104 is configured to provide factory calibration to the TOF depth camera 102. The update computing device 106 is configured to provide post-production calibration to the TOF depth camera 102 after the camera is sold or otherwise provided to a consumer. In other words, the update computing device 106 is configured to provide in-field recalibration functionality. Providing in-field recalibration enables the applicability of the TOF depth camera 102 to be increased by enabling timing errors to be recalculated based on adjustments in parameters of the camera. It will be appreciated that it may be desirable to change the parameters of the camera when new information becomes available, software algorithms are improved, the camera is used in unintended operating environments, etc. As a result, performance characteristics of the camera can be redistributed to improve camera operation for unanticipated end-use scenarios.

The methods for performing factory calibration of the TOF depth camera and updating calibration on the TOF depth camera 102 are discussed in greater detail herein. Further, in other examples, factory calibration and post-production dynamic calibration can be provided via a single computing device. Furthermore, as depicted in FIG. 1, the update computing device 106 is in electronic communication with the TOF depth camera 102 over a network 108, such as the Internet. However, other suitable networks have been contemplated. The calibration computing device 104 is shown in directly electronic communication with the TOF depth camera 102. Additionally, the calibration computing device 104 may communicate with the TOF depth camera 102 over a suitable network, including but not limited to the network 108.

The TOF depth camera 102 includes an image processing module 110 configured to determine timing errors as well as perform additional functions described in greater detail herein. The TOF depth camera 102 also includes a timing clock 112. The timing clock 112 is in electronic communication with the image processing module 110, which may be configured to store duty cycle and frequency combinations. The timing clock 112 is configured to generate modulation signals 114 (e.g., modulation voltages). It will be appreciated that the modulation signals 114 may be similar. For example, a similar modulation signal may be sent to the light source and the pixel shutters from the timing clock. It will be appreciated that even though the same signal may be sent from timing clock to the light source as well as the pixel shutters the signals received via the light source and the pixel shutter may have slight variations due to the difference in electrical connections over which the signals propagates. Therefore in one example, the modulation signal sent to the at least one shutter and the modulation signal sent to the light source are the same signal.

The modulation signals 114 may be generated based on modulation frequency and duty cycle combinations stored in the image processing module 110. As shown, the modulation signals 114 are sent from the timing clock 112 to a light source 116 and a pixel array 118. It will be appreciated that the modulation signal dictates the shape and timing of the waveform generated by the light source.

The light source 116 includes one or more lasers 120 and/or other suitable light generating devices such as light emitting diodes (LEDs). The lasers 120 are configured to generate light. In one example, the lasers are configured to emit light in the infrared spectrum (i.e., light within the wavelength range: 1 millimeter (mm)–700 nanometers (nm)). However, light sources generating light in other spectrums have been contemplated.

The pixel array 118 includes a plurality of pixel sensors 122. The pixel array 118 further includes at least one shutter 124 associated with each of the plurality of pixel sensors 122. In one example, two shutters may be associated with each of the plurality of pixel sensors. Further, in other examples it will be appreciated that the shutters are integrated into the plurality of pixel sensors 122. Still further, in one example, the pixel array 118 may be integrated into the timing clock 112. The modulation signal sent to the pixel array dictates the timing of shutter operation (e.g., opening and closing). Thus, the modulation signal determines the timing of the waveform received by the pixel array.

It will be appreciated that the light source 116 is configured to project light generated therein into a 3-dimensional environment 126, as denoted via arrow 128. The light is reflected off objects in the 3-dimensional environment 126 and returns to the plurality of pixel sensors 122, as denoted via arrow 130. It will be appreciated that the shutters 124 regulate the timing of the light that enters the plurality of pixel sensors 122. As shown, the pixel array 118 is in electronic communication with the image processing module 110, as denoted via arrow 132. The image processing module 110 is also in electronic communication with the timing clock 112, as denoted via arrows 133. Additionally, the image processing module 110 is configured to generate depth maps 134 based on signals received from the pixel array 118 and timing clock 112.

The timing clock 112 is configured to generate and send modulation signals 114 to a plurality of pixel sensors 122 and a light source 116, the modulation signal generated based on an updated set of modulation frequency and duty cycle calibration combinations received by the image processing module 110. Furthermore, the image processing module 110 is configured to interpolate an updated timing delay calibration for each of a plurality of pixel sensors 122 based on the updated set of modulation frequency and duty cycle calibration combinations received by the image processing module. The image processing module 110 is further configured to apply the timing delay calibrations to pixel data corresponding to each of the plurality of the pixel sensors 122 to generate a depth map of the 3-dimensional environment, the plurality of pixel sensors being coupled to the timing clock and receiving light generated by the light source and reflected in a 3-dimensional environment. The image processing module 110 is also configured to replace a set of factory-preloaded timing delay calibrations with the updated set of timing delay calibrations. Thus the updated set of timing delay calibrations may be different from the set of factory-preloaded timing delay calibrations. This dynamic calibration is discussed in greater detail herein.

Figure 2:
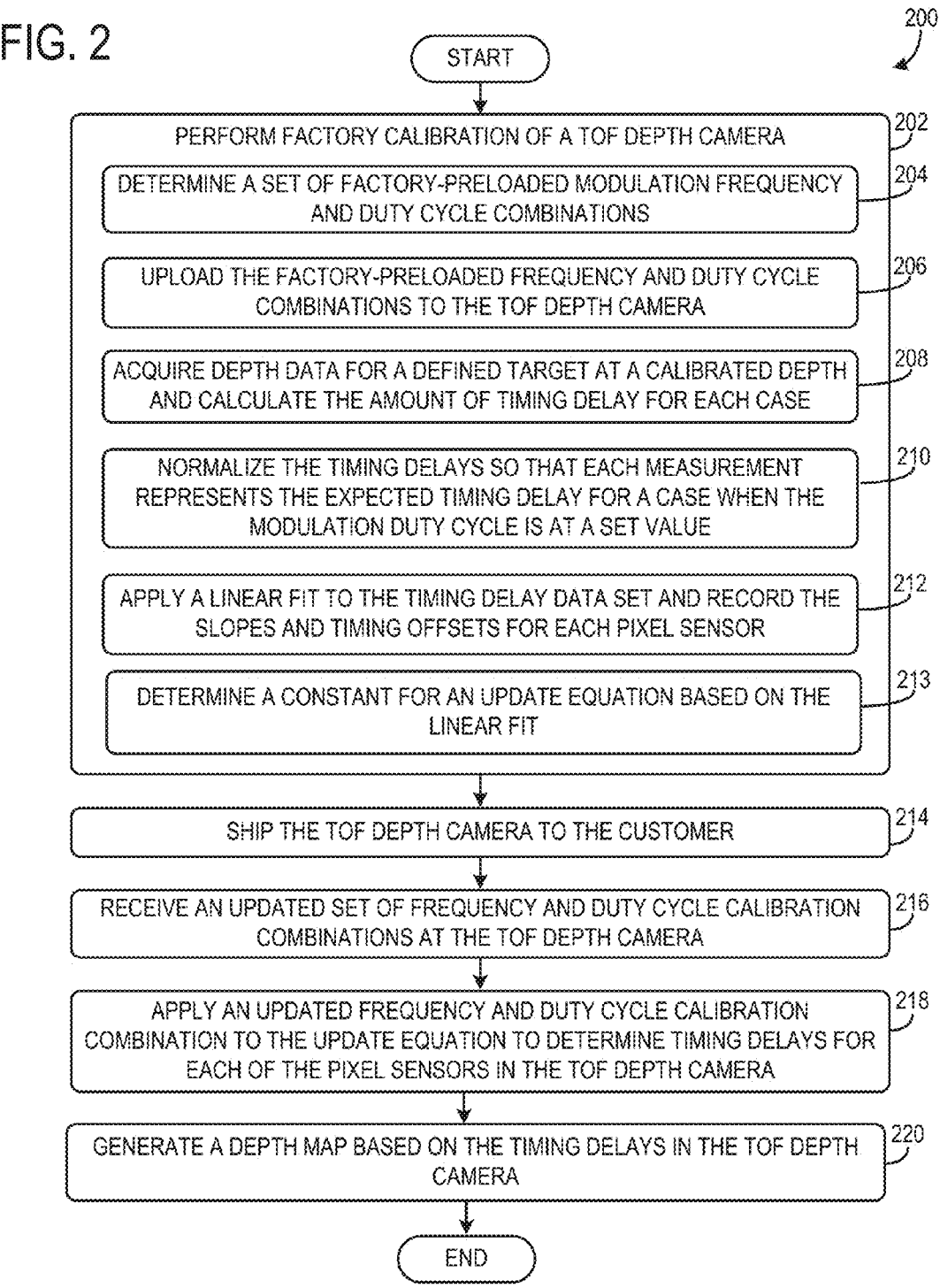
FIG. 2 shows a method for operation of a TOF system.

FIG. 2 shows a method 200 for operation of a TOF system. The method 200 may be used to operate the TOF system 100 described above with regard to FIG. 1. However, in other examples the method 200 may be used to operate another TOF system.

At 202 the method includes performing factory calibration of a TOF depth camera. Performing factory calibration of the TOF depth camera may include steps 204-213. At 204 the method includes determining a set of factory-preloaded modulation frequency and duty cycle combinations. It will be appreciated that these combinations may be decided based on an intended end-use environment and entered into a calibration computing device.

Next at 206, the method includes uploading the factory-preloaded frequency and duty cycle combinations to the TOF depth camera. Uploading these combinations may include electronically transferring (e.g., wired, wirelessly, etc.) the combinations from the calibration computing device to the TOF depth camera. Further in one example, brightness calibrations may additionally or alternatively be uploaded to the TOF camera at 206. It will be appreciated that the brightness calibrations may correspond to the magnitude of the signal sent to the light source and the pixel sensors in the TOF depth camera.

At 208 the method includes acquiring depth data for a defined target at a calibrated depth and calculating the amount of timing delay for each case. In this way, known depth values may be used to determine pixel phase offset. It will be appreciated that in some examples modulation duty cycle may vary between frequencies due to the configuration of the camera.

Next at 210, the method includes normalizing the timing delays so that each measurement represents the expected timing delay for a case when the modulation duty cycle is at a set value. In one example, the set value may be a 50% duty cycle. However, other set values of the duty cycle have been contemplated. At 212 the method includes applying a linear fit to the timing delay data set and recording the slopes and timing offsets for each pixel sensor. Recording the slopes and timing offsets for each pixel sensor may include storing the slopes and timing offsets in a look-up table in memory, such as flash storage. Linear regression of the data is discussed in greater detail herein with regard to FIG. 6.

At 213 the method includes determining a constant for an update equation based on the linear fit. In other examples, other types of fits may be used such as polynomial, sinusoidal, and/or linear+sinusoidal fits. Specifically in one example, the value of the slopes may define a constant in an update equation used for dynamic calibration once the camera is shipped to a consumer. The update equation is discussed in greater detail herein with regard to FIG. 4. Additionally, one or more of steps 204 and 208-213 may implemented via a calibration computing device, such as calibration computing device 104 of FIG. 1. It will be appreciated that the factory calibration in steps 202-213 sets the camera up to be quickly and efficiently calibrated once the camera is in the hands of the consumer.

At 214 the method includes shipping the TOF depth camera to the customer. Next at 216, the method includes receiving an updated set of frequency and duty cycle calibration combinations at the TOF depth camera. Further in one example, brightness values may be additionally or alternatively received by the TOF depth camera at 216. The updated set of frequency and duty cycle calibration combinations may be sent from an update computing device (e.g., update computing device 106 of FIG. 1) over a network, such as the Internet.

At 218 the method includes applying an updated frequency and duty cycle calibration combination to the update equation to determine timing delays for each of the pixel sensors in the TOF depth camera. Next at 220, the method includes generating a depth map based on the timing delays in the TOF depth camera (e.g., the timing delays determined at 218). In this way, dynamic calibration of the camera can be implemented in the field based on updated duty cycle and frequency combinations. As a result, the applicability of the camera is increased.

Figure 3:
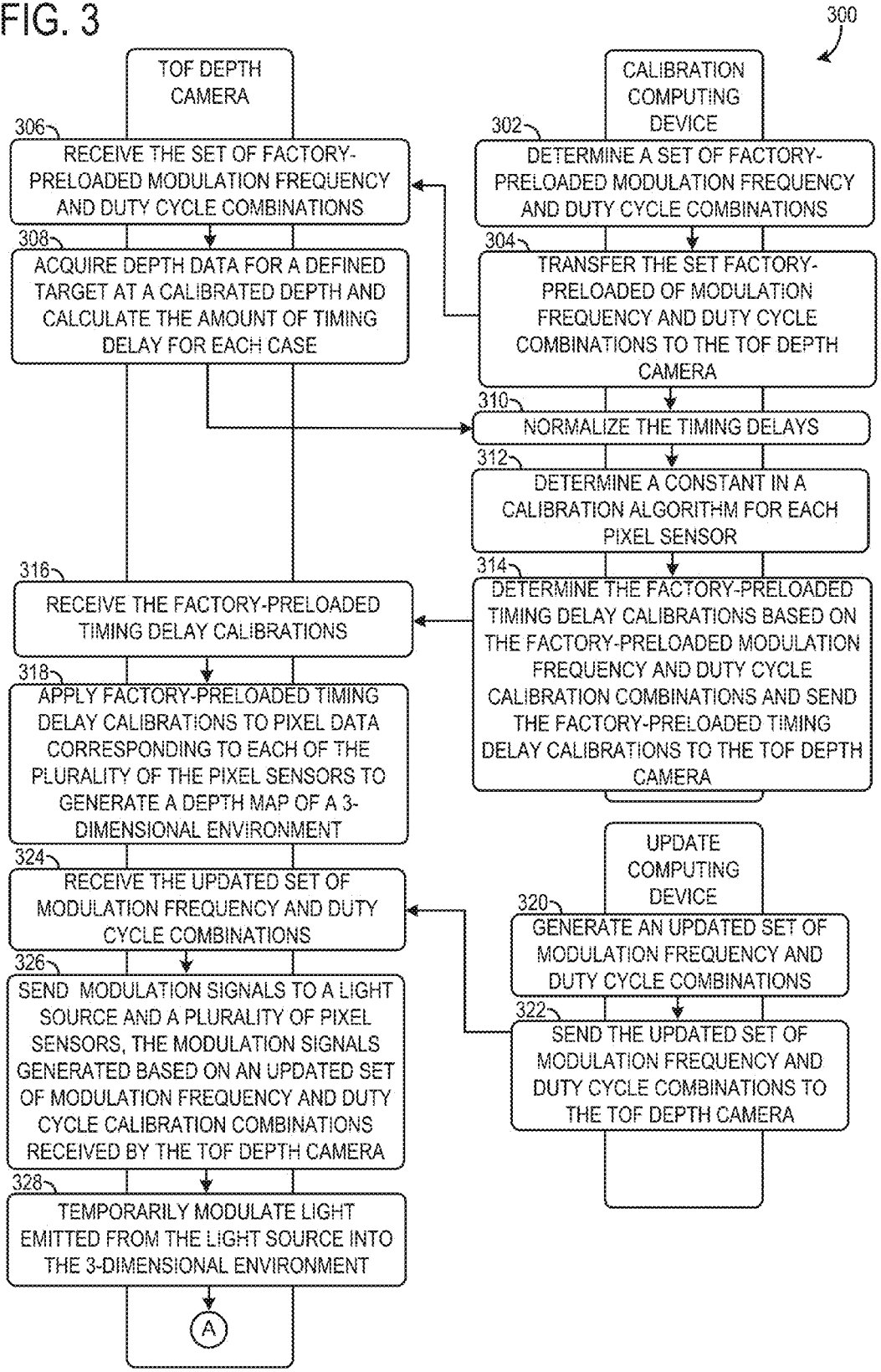
FIGS. 3 and 4 show another method for operation of a TOF system.
Figure 4:
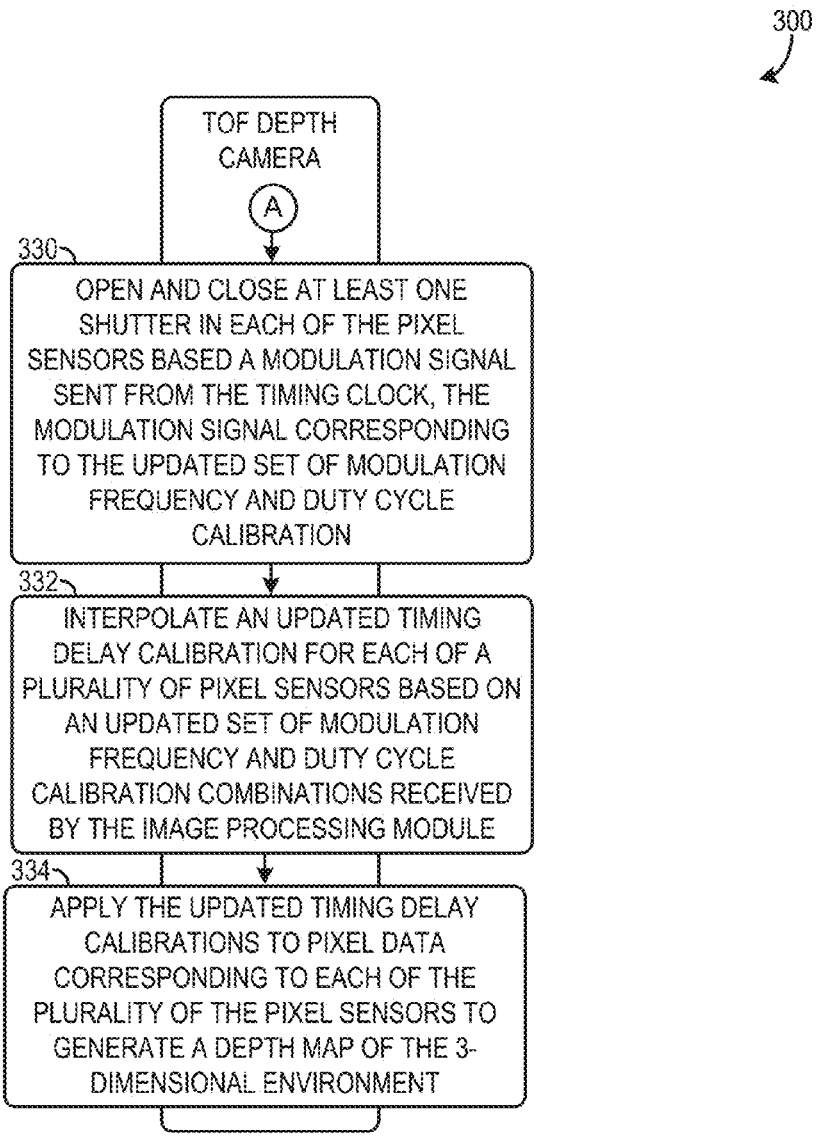

FIGS. 3 and 4 show a method 300 for operation of a TOF system. The method 300 may be used to operate the TOF system 100 described above with regard to FIG. 1. However, in other examples the method 300 may be used to operate another suitable TOF system.

At 302 the method includes determining a set of factory-preloaded modulation frequency and duty cycle combinations. It will be appreciated that these combinations may be decided based on an intended end-use environment and entered into a calibration computing device (e.g., calibration computing device 104 of FIG. 1). Next at 304, the method includes transferring the set factory-preloaded of modulation frequency and duty cycle combinations to the TOF depth camera.

At 306 the method includes receiving the set of factory-preloaded modulation frequency and duty cycle combinations at the TOF camera. Next at 308, the method includes acquiring depth data for a defined target at a calibrated depth and calculating the amount of timing delay for each case.

Next at 310, the method includes normalizing the timing delays. It will be appreciated that the timing delays may be calculated based on depth data acquired at different duty cycles. Normalizing the timing delays may include adjusting the timing delays based on a common duty cycle. In other words, the values of the timing delays measured at different duty cycles are adjusted to fit to a common duty cycle. Thus, the timing delays are appropriately scaled via normalization to account for the different duty cycles.

At 312 the method includes determining a constant in a calibration algorithm for each pixel sensor. The constant in the calibration algorithm may be a linear constant determined based on Equation 1, shown below and discussed in greater detail herein. However, in other examples alternate suitable equations may be used as the calibration algorithm. Determining the constant in this way enables the camera to be configured for subsequent dynamic calibration.

At 314 the method includes determining the factory-preloaded timing delay calibrations based on the factory-preloaded modulation frequency and duty cycle calibration combinations and sending the factory-preloaded timing delay calibrations to the TOF depth camera. At 316 the method includes receiving the factory-preloaded timing delay calibrations. It will be appreciated that steps 302-316 are implemented during factory calibration prior to shipping the camera to the consumer.

Next at 318, the method includes applying factory-preloaded timing delay calibrations to pixel data corresponding to each of the plurality of the pixel sensors to generate a depth map of a 3-dimensional environment.

At 320 the method includes generating an updated set of modulation frequency and duty cycle combinations. At 322 the method includes sending the updated set of modulation frequency and duty cycle combinations to the TOF depth camera. It will be appreciated that the updated set of modulation frequency and duty cycle combinations may be sent over a network, such as the Internet. Next at 324, the method includes receiving the updated set of modulation frequency and duty cycle combinations at the TOF camera.

At 326 the method includes sending modulation signals to a light source and a plurality of pixel sensors, the modulation signals being generated based on an updated set of modulation frequency and duty cycle calibration combinations received by the TOF depth camera. In one example, the light source includes a laser generating light in the infrared spectrum. At 328 the method includes temporarily modulating light emitted from the light source into the 3-dimensional environment. In one example, the light source may be switched on and off or partially switched on and off Steps 302, 304, 310, 312, and 314 are implemented via the calibration computing device and steps 306, 308, 316, 318, 324, 326, and 328 are implemented via the TOF depth camera. It will be appreciated that steps implemented via the TOF camera may be implemented via the image processing module in the TOF depth camera. Additionally, steps 320 and 322 are implemented via the update computing device.

Turning to FIG. 4, at 330 the method includes opening and closing at least one shutter in each of the pixel sensors based a modulation signal sent from the timing clock, the modulation signal corresponding to the updated set of modulation frequency and duty cycle calibration combinations.

At 332 the method includes interpolating an updated timing delay calibration for each of a plurality of pixel sensors based on an updated set of modulation frequency and duty cycle calibration combinations received by the image processing module. It will be appreciated that the updated set of timing delay calibrations replace a set of factory-preloaded timing delay calibrations in the camera. It will be appreciated that equation 1 described in greater detail herein may be used to interpolate the updated timing delay calibration for each of the plurality of pixel sensors. Therefore, interpolating the updated timing delay calibration may include entering frequency and duty cycle values into an algorithm. Further in one example, interpolating the updated timing delay calibration includes computing the average of a plurality of timing delays. Next at 334, the method includes applying the updated timing delay calibrations to pixel data corresponding to each of the plurality of the pixel sensors to generate a depth map of the 3-dimensional environment. In one example, the updated timing delay calibrations are applied to a phase offset of a modulated waveform of light generated by the light source and a waveform of light received by each of the pixel sensors. Further in one example, the depth map includes a matrix of depth pixels. As shown, steps 330, 332, and 334 are implemented via the TOF depth camera.

Figure 5:
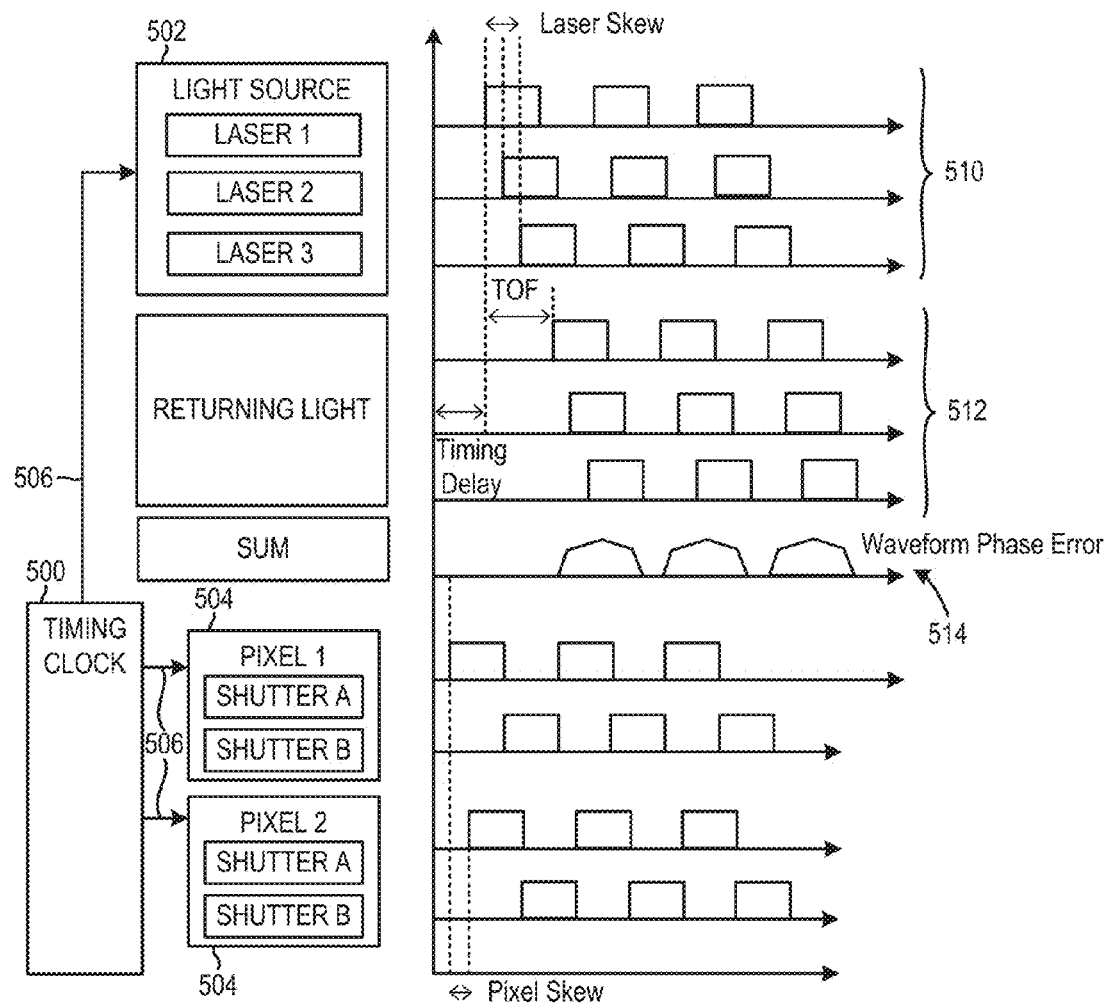
FIG. 5 shows an example TOF system and graphical representation of the TOF and timing delay in the TOF system.

FIG. 5 shows a timing diagram related to timing delay in the TOF system. A timing clock 500 is shown in FIG. 5. The timing clock 500 is configured to send a modulation signal to a light source 502 and pixel 504, denoted via arrows 506. It will be appreciated that the aforementioned components are examples of the components of the TOF system 100 shown in FIG. 1.

The light source 502 includes 3 lasers in the depicted example. However, light sources having alternate number of laser or other light generating devices have been contemplated. For example, the light source may include a single laser or four or more lasers. Additionally, each of the pixels 504 has two shutters, in the depicted example. However, pixels with alternate numbers of shutters may be used in other examples. Further in one example, the pixels 504 may be integrated into the timing clock 500. The waveforms of the light generated via the light source, and specifically the 3 lasers, are shown at 510. Likewise, the signal generated via pixels based on the returning light is shown at 512. The waveform phase error is also shown at 514. The TOF between the light emitted via the light source and the returning light is illustrated. Additionally, the timing delay in the TOF system is also shown in FIG. 5. It will be appreciated that timing errors in the system occur because of a number of factors such as the configuration of the electronic components in the system, the latency in the electronic components, etc. The waveform phase error is shown at 514 and the pixel skew in the pixel shutters is also illustrated in FIG. 5. It will be appreciated that the method described above may be used to determine the timing delays for the pixels and account for these timing delays in camera operation.

Figure 6:
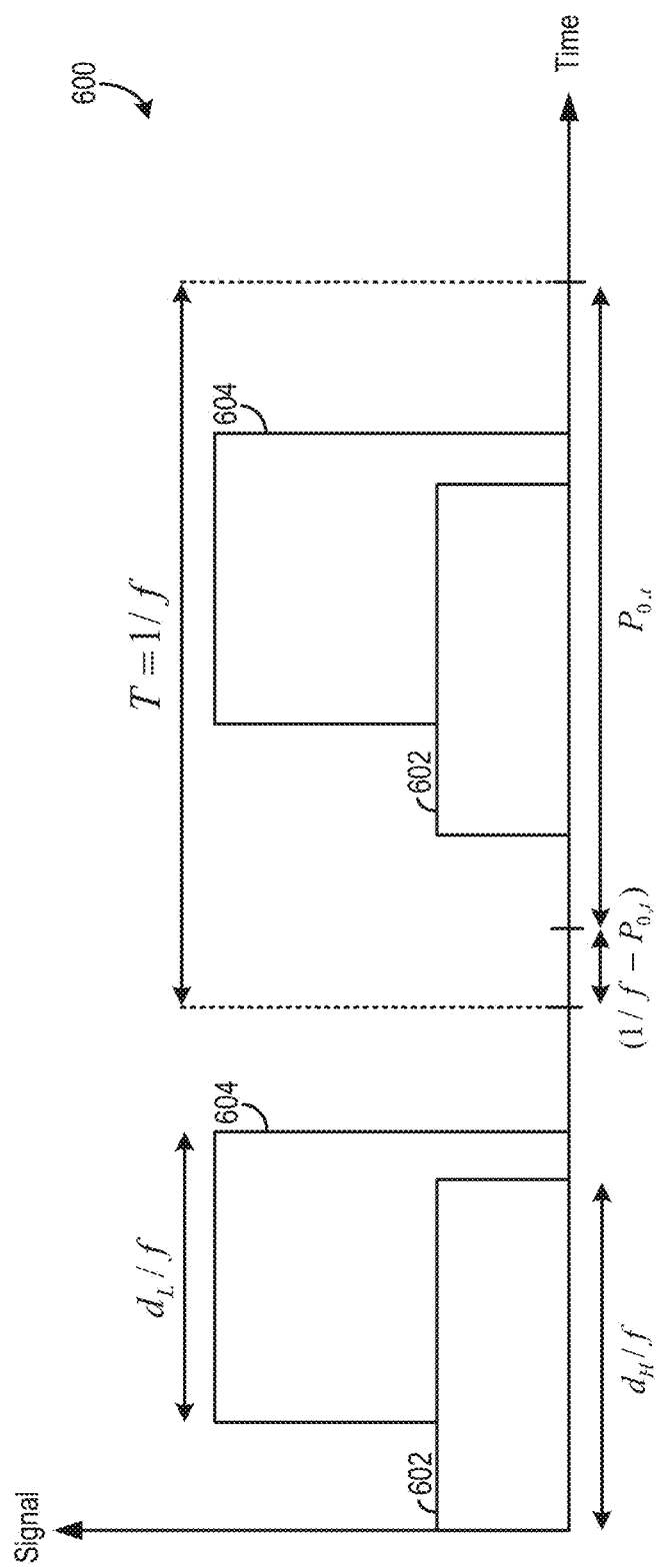
FIG. 6 shows a graphical representation of the timing delay between a waveform received via a pixel sensor included in the plurality of pixel sensors and a waveform sent from the light source.

FIG. 6 shows an exemplary graphical representation 600 of the timing delay between a modulation signal 602 received via a pixel sensor included in the plurality of pixel sensors 122, shown in FIG. 1. It will be appreciated that the pixel sensor receives the modulation signal having a frequency and duty cycle from the timing clock. FIG. 6 also shows a waveform 604 sent from the light source 116, shown in FIG. 1. It will be appreciated that the waveform sent from the light source may be generated based on the modulation signal sent to the light source. The y-axis represents signal strength, while the x-axis represents time. A timing delay for each pixel sensor is a period of delay applied to the pixel sensor when determining TOF for the light emitted from the light source and received by the pixel sensor. The timing delay for each of the pixel sensors, expressed as $P^*_{0,t}$, may be calculated according to the following equation;

$$P^*_{0,t} = -[\Delta t_L]f + [1 + \frac{1}{2}(d_H - d_L)] \quad \text{(Equation 1)}$$

It will be appreciated that timing delay for each of the pixel sensors is a period of time which it takes the modulation signal to travel from the timing clock, through the electronic components to actuate the pixel sensors (e.g., shutters in the pixel sensors). $P^*_{0,t}$ is a fractional period, $[\Delta t_L]$ is a constant (e.g., system level timing delay), f is the frequency of the modulation signal, $d_H$ is the duty cycle of the modulation signal sent to the pixel sensor, and $d_L$ is the duty cycle of the modulation signal sent to the to the light source. The fractional period is essentially a timing delay calibration. It will be appreciated that the equation can be used to interpolate the timing delay calibration based on updated modulation frequency and duty cycle combinations.

The time-of-flight is measured as the phase difference between the returning waveform superposition and the shutter modulation of each individual pixel. To improve the quality of the calibration and period prediction additional techniques may be used to reduce systematic errors before computing linear fit. Specifically, the deviations of the measured data samples from the linear fit may be caused by systematic errors in the measurement process. In particular, harmonic multiples of the modulation frequency may be present in the light source signal. The harmonic multiples may cause a small phase error which depends on the modulation frequency and the distance of the target. One technique for reducing the systematic errors includes introducing an electronic delay between the modulation signal and the light source signal, or between the modulation signal and the pixel array. This will result in the estimated timing delay to be increased by the known electronic delay. Subtraction of the known electronic delay from the estimated timing delay will give an additional estimate of the timing delay. In a perfect TOF camera system without systematic errors these different estimations of the timing delay with different known electronic delays would be equal. However, for a TOF system with systematic errors these estimations may lead to different values of the estimated timing delay. For such a system, performing the estimation of the timing delay multiple times while applying multiple of such additional electronic delays will lead to many similar but not equal estimates of the timing delay. These multiple estimates of the timing delays may be combined into a single "final" estimate of the timing delay, for instance by computing the arithmetic mean over all estimated timing delays. This final estimate of the timing delays may generally be more accurate than the original single estimate.

Figure 7:
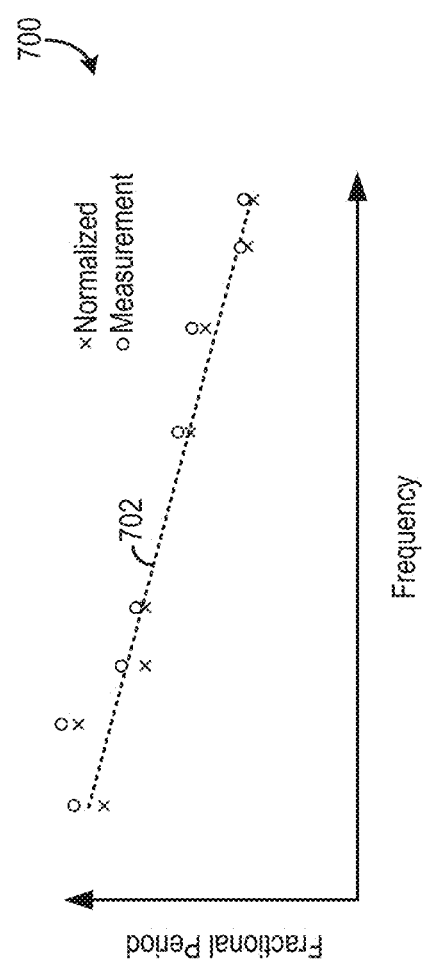
FIG. 7 shows a graphical representation of linear regression of data acquired during factory calibration of a TOF depth camera.

FIG. 7 a graphical representation 700 of exemplary data acquired for a single TOF depth camera during factory calibration of the TOF depth camera. As shown, the fractional period is on the y-axis and the modulation frequency is on the x-axis. The fractional period is essentially the timing delay for each pixel. It will be appreciated that the data points may be normalized to a single duty cycle value (e.g., 50%) to account for differing duty cycles between the different data points, as previously discussed. The O values ("Measurement") represent the data points measured during factory calibration of the TOF depth camera. The x values ("Normalized") represent the normalized data points. It will be appreciated that the slope of the linear fit 702 may be analogous to the linear constant $[\Delta t_L]$, discussed above with regard to FIG. 6.

FIG. 8 shows a non-limiting embodiment of a computing device 800 that can enact one or more of the methods and processes described above. Therefore, it will be appreciated that the camera (e.g., TOF depth camera 102 of FIG. 1) and computing device (e.g., calibration computing device 104 and/or update computing device 106 of FIG. 1) described above may include one or more of the components in computing device 800.

Computing device 800 includes a logic machine 802 and a storage machine 804. Computing device 800 may optionally include a display system 806, input system 808, communication system 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing device 800 implemented to perform a particular function. In some cases, a module, program, or engine may be instantiated via logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display system 806 may be used to present a visual representation of data held by storage machine 804. This visual representation may take the form of a graphical user interface (GUI). As the herein described methods and processes change the data held by the storage machine, and thus transform the state of the storage machine, the state of display system 806 may likewise be transformed to visually represent changes in the underlying data. Display system 806 may include one or more display devices utilizing virtually any type of technology. Such display devices may be combined with logic machine 802 and/or storage machine 804 in a shared enclosure, or such display devices may be peripheral display devices.

When included, input system 808 may comprise or interface with one or more user-input devices such as a keyboard, mouse, touch screen, or game controller. In some embodiments, the input system may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication system 810 may be configured to communicatively couple computing system 800 with one or more other computing devices. Communication system 810 may include wired and/or wireless communication devices compatible with one or more different communication protocols. As non-limiting examples, the communication system may be configured for communication via a wireless telephone network, or a wired or wireless local- or wide-area network. In some embodiments, the communication system may allow computing device 800 to send and/or receive messages to and/or from other devices via a network such as the Internet. The subject matter of the present disclosure is further described in the following paragraphs.

According to one aspect, a method for operating a time of flight (TOF) system is provided. The method includes using an image processing module, interpolating an updated timing delay calibration for each of a plurality of pixel sensors based at least on an updated set of modulation frequency and duty cycle calibration combinations received by the image processing module, the plurality of pixel sensors coupled to a timing clock and receiving light generated by a light source and reflected in a 3-dimensional environment, the updated set of modulation frequency and duty cycle calibration combinations replacing the corresponding factory-preloaded timing delay calibrations; and applying the updated timing delay calibrations to pixel data corresponding to each of the plurality of the pixel sensors to generate a depth map of the 3-dimensional environment.

In this aspect, the method may further include, prior to interpolating the updated timing delay calibrations, at the image processing module, receiving the updated set of modulation frequency and duty cycle calibration combinations at the image processing module from an update computing device.

In this aspect, the updated set of modulation frequency and duty cycle calibration combinations may be sent over a network.

In this aspect, the method may further include, prior to interpolating the updated timing delay calibrations, at the image processing module, applying factory-preloaded timing delay calibrations to pixel data corresponding to each of the plurality of the pixel sensors to generate a second depth map of a second 3-dimensional environment, the factory-preloaded timing delay calibration corresponding to a set of factory-preloaded modulation frequency and duty cycle calibration combinations different from the updated set of modulation frequency and duty cycle calibration combinations.

In this aspect, the method may further include, at a calibration computing device, prior to applying the factory-preloaded timing delay calibrations, determining a constant in a calibration algorithm for each pixel sensor and determining the factory-preloaded timing delay calibrations based on the factory-preloaded modulation frequency and duty cycle calibration combinations.

In this aspect, the factory-preloaded modulation frequency and duty cycle calibration combinations may be normalized to determine the constant.

In this aspect, interpolating the updated timing delay calibration may include computing the average of a plurality of timing delays.

In this aspect, the light source may include a laser, the laser generating light in the infrared spectrum.

In this aspect, the updated timing delay calibrations may be applied to a phase offset of a modulated waveform of light generated by the light source and a waveform of light received by each of the pixel sensors.

In this aspect, the depth map includes a matrix of depth pixels.

In this aspect, the light generated by the light source is generated based on a modulation signal sent from the timing clock, the modulation signal corresponding to the updated set of modulation frequency and duty cycle calibration combinations.

In this aspect, the method may further include opening and closing at least one shutter in each of the pixel sensors based a modulation signal sent from the timing clock, the modulation signal corresponding to the updated set of modulation frequency and duty cycle calibration combinations.

In this aspect, the modulation signal sent to the at least one shutter and the modulation signal sent to the light source may be the same signal.

In this aspect, prior to interpolating the updated timing delay calibrations, at the light source, pulsing light emitted from the light source into the 3-dimensional environment.

According to another aspect, a time of flight (TOF) depth camera is provided. The TOF depth camera includes a timing clock configured to generate and send modulation signals to a plurality of pixel sensors and a light source, the modulation signals generated based at least on an updated set of modulation frequency and duty cycle calibration combinations received by an image processing module; and the image processing module configured to (i) interpolate an updated timing delay calibration for each of a plurality of pixel sensors based on the updated set of modulation frequency and duty cycle calibration combinations received by the image processing module, (ii) apply the timing delay calibrations to pixel data corresponding to each of the plurality of the pixel sensors to generate a depth map of the 3-dimensional environment, and (iii) replace a set of factory-preloaded timing delay calibrations with the updated set of timing delay calibrations, the plurality of pixel sensors coupled to the timing clock and configured to receive light generated by the light source and reflected in a 3-dimensional environment.

In this aspect, the modulation signals may be similar modulation voltages sent to the plurality of pixel sensor and the light source.

In this aspect, each of the plurality of pixel sensors may include a shutter.

In this aspect, the TOF system may further include at an update computing device configured to, prior to applying the factory-preloaded timing delay calibrations, determine a constant in a calibration algorithm for each pixel sensor, determine the factory-preloaded timing delay calibrations based on the factory-preloaded modulation frequency and duty cycle calibration combinations, and transfer the calibration algorithm to the image processing module.

According to another aspect, a method for operating a time of flight (TOF) system is provided. The method includes using a timing clock, sending modulation signals to a light source and a plurality of pixel sensors, the modulation signals generated based on an updated set of modulation frequency and duty cycle calibration combinations received by the TOF depth camera; using an image processing module, interpolating an updated timing delay calibration for each of the plurality of pixel sensors based at least on the updated set of modulation frequency and duty cycle calibration combinations, the updated set of modulation frequency and duty cycle calibration combinations replacing the corresponding factory-preloaded timing delay calibrations; and applying the updated timing delay calibrations to pixel data corresponding to each of the plurality of the pixel sensors to generate a depth map of a 3-dimensional environment.

In this aspect, interpolating the updated timing delay calibrations may include entering the updated set of modulation frequency and duty cycle calibration combinations into a calibration algorithm, the calibration algorithm including a constant determined during factory calibration.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof

The invention claimed is:

1. A method for operating a time of flight (TOF) system comprising:
   using an image processing module, interpolating an updated timing delay calibration for each of a plurality of pixel sensors based at least on an updated set of modulation frequency and duty cycle calibration combinations received by the image processing module, the plurality of pixel sensors coupled to a timing clock and receiving light generated by a light source and reflected in a 3-dimensional environment, the updated set of modulation frequency and duty cycle calibration combinations replacing the corresponding factory-preloaded timing delay calibrations; and
   applying the updated timing delay calibrations to pixel data corresponding to each of the plurality of the pixel sensors to generate a depth map of the 3-dimensional environment.

2. The method of claim 1, further comprising, prior to interpolating the updated timing delay calibrations, at the image processing module, receiving the updated set of modulation frequency and duty cycle calibration combinations at the image processing module from an update computing device.

3. The method of claim 2, where the updated set of modulation frequency and duty cycle calibration combinations are sent over a network.

4. The method of claim 1, further comprising, prior to interpolating the updated timing delay calibrations, at the image processing module, applying the factory-preloaded timing delay calibrations to pixel data corresponding to each of the plurality of the pixel sensors to generate a second depth map of a second 3-dimensional environment, the factory-preloaded timing delay calibrations corresponding to a set of factory-preloaded modulation frequency and duty cycle calibration combinations different from the updated set of modulation frequency and duty cycle calibration combinations.

5. The method of claim 4, further comprising, at a calibration computing device, prior to applying the factory-preloaded timing delay calibrations, determining a constant in a calibration algorithm for each pixel sensor and determining the factory-preloaded timing delay calibrations based on the factory-preloaded modulation frequency and duty cycle calibration combinations.

6. The method of claim 5, where the factory-preloaded modulation frequency and duty cycle calibration combinations are normalized to determine the constant.

7. The method of claim 1, where interpolating the updated timing delay calibration includes computing the average of a plurality of timing delays.

8. The method of claim 1, where the light source includes a laser, the laser generating light in the infrared spectrum.

9. The method of claim 1, where the updated timing delay calibrations are applied to a phase offset of a modulated waveform of light generated by the light source and a waveform of light received by each of the pixel sensors.

10. The method of claim 1, where the depth map includes a matrix of depth pixels.

11. The method of claim 1, where the light generated by the light source is generated based on a modulation signal sent from the timing clock, the modulation signal corresponding to the updated set of modulation frequency and duty cycle calibration combinations.

12. The method of claim 11, further comprising opening and closing at least one shutter in each of the pixel sensors based a modulation signal sent from the timing clock, the modulation signal corresponding to the updated set of modulation frequency and duty cycle calibration combinations.

13. The method of claim 12, where the modulation signal sent to the at least one shutter and the modulation signal sent to the light source are the same signal.

14. The method of claim 1, further comprising, prior to interpolating the updated timing delay calibrations, at the light source, pulsing light emitted from the light source into the 3-dimensional environment.

15. A time of flight (TOF) depth camera comprising:
   a timing clock configured to generate and send modulation signals to a plurality of pixel sensors and a light source, the modulation signals generated based at least on an updated set of modulation frequency and duty cycle calibration combinations received by an image processing module; and
   the image processing module configured to (i) interpolate an updated timing delay calibration for each of a plurality of pixel sensors based on the updated set of modulation frequency and duty cycle calibration combinations received by the image processing module, (ii) apply the timing delay calibrations to pixel data corresponding to each of the plurality of the pixel sensors to generate a depth map of the 3-dimensional environment, and (iii) replace a set of factory-preloaded timing delay calibrations with the updated set of timing delay calibrations, the plurality of pixel sensors coupled to the timing clock and configured to receive light generated by the light source and reflected in a 3-dimensional environment.

16. The TOF depth camera of claim 15, where the modulation signals are similar modulation voltages sent to the plurality of pixel sensor and the light source.

17. The TOF depth camera of claim 15, where each of the plurality of pixel sensors includes a shutter.

18. The TOF system of claim 15, further comprising, at an update computing device configured to, prior to applying the factory-preloaded timing delay calibrations, determine a constant in a calibration algorithm for each pixel sensor, determine the factory-preloaded timing delay calibrations based on the factory-preloaded modulation frequency and duty cycle calibration combinations, and transfer the calibration algorithm to the image processing module.

19. A method for operating a time of flight (TOF) system comprising:
   using a timing clock, sending modulation signals to a light source and a plurality of pixel sensors, the modulation signals generated based on an updated set of modulation frequency and duty cycle calibration combinations received by the TOF depth camera;
   using an image processing module, interpolating an updated timing delay calibration for each of the plurality of pixel sensors based at least on the updated set of modulation frequency and duty cycle calibration combinations, the updated set of modulation frequency and duty cycle calibration combinations replacing the corresponding factory-preloaded timing delay calibrations; and
   applying the updated timing delay calibrations to pixel data corresponding to each of the plurality of the pixel sensors to generate a depth map of a 3-dimensional environment.

20. The method of claim 19, where interpolating the updated timing delay calibrations includes entering the updated set of modulation frequency and duty cycle calibration combinations into a calibration algorithm, the calibration algorithm including a constant determined during factory calibration.

* * * * *